United States Patent
Roddy et al.

(10) Patent No.: US 6,882,356 B2
(45) Date of Patent: Apr. 19, 2005

(54) METHOD AND APPARATUS FOR WATERMARKING FILM

(75) Inventors: James E. Roddy, Rochester, NY (US); Robert J. Zolla, Rochester, NY (US); Leslie Gutierrez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 62 days.

(21) Appl. No.: 10/364,488

(22) Filed: Feb. 11, 2003

(65) Prior Publication Data

US 2004/0156111 A1 Aug. 12, 2004

(51) Int. Cl.[7] .............................. B41J 2/447; B41J 2/45
(52) U.S. Cl. ...................................................... 347/224
(58) Field of Search ................. 347/224, 239, 347/255, 232, 233

(56) References Cited

U.S. PATENT DOCUMENTS

| | | | |
|---|---|---|---|
| 4,760,407 A | * | 7/1988 | Arimoto et al. ............ 347/241 |
| 5,752,152 A | | 5/1998 | Gasper et al. |
| 6,044,182 A | | 3/2000 | Daly et al. |
| 6,215,547 B1 | | 4/2001 | Ramanujan et al. |
| 6,330,018 B1 | | 12/2001 | Ramanujan et al. |
| 6,407,767 B1 | | 6/2002 | Klees et al. |
| 6,496,818 B1 | | 12/2002 | Ponte |
| 6,624,949 B1 | * | 9/2003 | Roddy et al. ............... 359/634 |
| 2004/0150794 A1 | * | 8/2004 | Kurtz et al. .................. 353/31 |

FOREIGN PATENT DOCUMENTS

FR 2 811 258 7/2000

OTHER PUBLICATIONS

Roy Berns; Billmeyer and Saltzman's Principles of Color Technology, Third Edition; 2000, pp. 14–16.

* cited by examiner

*Primary Examiner*—Huan Tran
(74) *Attorney, Agent, or Firm*—Nelson Adrian Blish

(57) ABSTRACT

A printing method and apparatus (100) for pre-exposing a digital watermark image onto a photosensitive medium (140) at the time of manufacture is disclosed. For exposure energy, the apparatus employs a single color light source (60) consisting of an array of LEDs. The LEDs are spatially modulated in intensity by means of a reflective LCD array (91). The photosensitive medium (140) may be compensated to allow such single color pre-exposure while avoiding hue shift and contrast loss. The exposure at the film may be increased by: employing partial frame illumination, pulsing the LEDs with high currents with short pulse durations and low duty cycles, employing two LCD devices (91, 92) to utilize both polarizations, and dichroically combining two LED (60, 61) arrays of slightly different wavelengths.

34 Claims, 9 Drawing Sheets

METHOD AND APPARATUS FOR WATERMARKING FILM

CROSS REFERENCE TO RELATED APPLICATIONS

Reference is made to commonly-assigned copending U.S. patent application Ser. No. 10/067,929, filed Feb. 6, 2002, entitled PRINTING APPARATUS FOR PHOTOSENSITIVE MEDIA USING DICHROIC PRISM IN ILLUMINATION PATH, by Roddy et al. and U.S. patent application Ser. No. 10/342,009, filed Jan. 14, 2003, entitled IMPROVED LIGHT USING LARGE AREA LEDs, by Oehlbeck et al., the disclosures of which are incorporated herein.

FIELD OF THE INVENTION

This invention relates to watermarking film in general, and in particular to watermarking motion picture print film at high speeds.

BACKGROUND OF THE INVENTION

Unauthorized copying and redistribution of feature length movies represents a source of lost revenue for the movie studios. Advances in technology have made it easier to make and distribute unauthorized copies of such materials. There exists a need to identify unauthorized copies and to track them to the source of the copy. One method is to embed information in the image itself.

It is known that images or photographs can have information contained within the image area such as bar codes, date, and time. There have also been attempts to embed digital information, a digital watermark, in the image area, for example, for copyright protection. It is desirable to have such information embedded in pictorial images with minimal visibility under normal viewing conditions, while retaining the existing quality of the image. It is also desirable to have a method and an apparatus that can apply such a watermark at high speed to the color print film at the time of manufacture. The print film can then be tracked to a particular print of a given movie and to the theater in which that particular print copy was shown. The watermark itself would not necessarily prevent unauthorized copying, for example by a camcorder in the theater, but could provide a trace to the theater in which the copy was made.

U.S. Pat. No. 6,496,818 (Yoda), discusses embedding a pattern in a color print and adjusting cyan, magenta, yellow, black (CMYK) values such that the embedded data matches the color of the surround when viewed under a standard illuminant. Not only is such a technique directed at paper prints, a prior knowledge of the pictorial image data is required to accomplish the color matching. Such information would change from scene to scene, and would not be available to the film manufacturer at the time of manufacture.

U.S. Pat. No. 5,752,152 (Gasper et al.) presents another technique directed primarily at restricting unauthorized copying of photo studio paper prints. A pattern of microdots, less than 300 $\mu$m in diameter, is embedded into or deposited on the media. Typically, this watermarking is done by light exposure at the time of photographic paper manufacture. The restriction on maximum dot size helps to ensure that the array of dots is not visible to the unaided eye. Furthermore, the exposure is done with blue light such that the dots appear yellow when the paper is developed. Because a pictorial image is also present along with the array of microdots, the dot pattern becomes essentially invisible to the eye. Although an interesting concept, the pattern provides basically a "go, no-go" decision, allowing or preventing copying of the photograph. An identifier code, which can be varied for each copy of the movie, is needed for the movie industry.

U.S. Pat. No. 6,044,182 (Daly et al.) describes a method of embedding digital codes in an image that is combined with an encoding carrier image to produce a frequency dispersed data image. The frequency dispersed data image is added to a pictorial image to produce a source image containing embedded data. The frequency dispersed data image tends to mimic the grain noise in a photographic pictorial image. The embedded frequency dispersed image data can be laid down in tiles, e.g. 256 pixels by 256 pixels, with each tile containing the complete coded data. Thus, data can be spatially redundant within each frame to increase robustness.

Techniques similar to that described in U.S. Pat. No. 6,044,182 are being tested for use in digital cinema projectors. The frequency dispersed data image is applied to the digital image data at a low level in all three color channels, red, green, blue (RGB), in order to keep the embedded image neutral and not cause a hue shift. Spatial Light Modulator (SLM) resolutions up to QXGA (2048 pixels by 1536 lines) are available to allow a frequency dispersed data image to appear similar to film grain. Such a technique looks promising for digital cinema, but presents difficult exposure requirements for watermarking color print film.

It is desirable to pre-expose the color print film with the watermark as part of the film manufacturing process. At a particular point in the manufacturing process, the film transport speed is sufficiently well controlled where it is wrapped around a 6" diameter drum. The film is moving at speeds up to 50 feet/second. To lay down a frequency dispersed image at high resolution at this speed without significant motion blur which would prevent subsequent detection of the embedded code, the exposure times may be as short as 100 ns. A 12 um pixel imaged on the film moving at 50 feet/second will experience an image motion smear of about 1.2 um or about 10% during a period of 100 ns. Minimizing smear or motion blur is important in being able to decode the embedded data reliably. A practical light source with sufficient radiance and power that can be turned on and off at such short times, coupled to an efficient writer optical system, to enable exposure at such writing speeds, represents a significant challenge.

An apparatus for exposing sensitometric (calibration) patches and barcode data onto color negative film during the manufacturing process is presented in U.S. Pat. No. 6,407,767 (Klees et al.) Two white light flashlamps, one large and one small are located in an integrating sphere and the resulting light is appropriately attenuated and directed through fibers to form what becomes gray scale patches on the processed film. These gray scale patches are used to control subsequent printing operations. The large flashlamp is repeatedly fired to approach the necessary exposure, and the exposure is then fine tuned by firing the small flashlamp, providing a very accurate exposure. A transmissive LCD is used in a separate optical system to provide the bar code. While this device can provide accurate color-neutral exposure onto stationary film as part of the manufacturing process, its power is not sufficient for exposing film at 50 feet/second, nor is its resolution sufficient to ensure the embedded data will not be easily seen by the eye by mimicking photographic grain.

U.S. Pat. No. 6,215,547 (Ramanujan et al.) discusses a writer with an Light Emitting Diode (LED) light source and a reflective LCD spatial light modulator with sufficient resolution to effectively expose a grain-like frequency dispersed data image. However, although the LED source may be capable of fast modulation speeds, it is not sufficiently powerful to deliver adequate exposure in any color at speeds significantly less than one second.

U.S. Pat. No. 6,330,018 (Ramanujan et al.) discloses that by using two LCD arrays, both of the orthogonal polarizations can be imaged. Such a construction, using identical image information on both LCDs, would effectively increase the efficiency of the optical system by a factor of two, while also increasing cost and complexity. A 2:1 increase in light at the film plane over that available from the device of U.S. Pat. No. 6,215,547 is still insufficient to expose color print film at times near 100 ns.

U.S. patent application Ser. No. 10/342,009 describes an improved LED light source over that of U.S. Pat. Nos. 6,215,547 and 6,330,018. However, it is estimated that even this light source structure, using four large area LEDs, modified and optimized for the watermarking application, would be inadequate in exposure by a factor of 30 to 40 for exposure times approaching 100 ns.

It is desirable to expose photographic media at very high media transport speeds at the time of manufacture with an essentially invisible watermark.

SUMMARY OF THE INVENTION

It is an object of this invention to provide a method and apparatus for exposing an essentially invisible watermark onto photographic media at high media transport speeds at the time of manufacture. The present invention is directed at overcoming one or more of the problems set forth in the background of the invention.

Briefly, according to one embodiment of the present invention a method of writing a watermark to film comprises the steps of: compensating an emulsion of the film for pre-exposure to a single color light; transporting the film past a spatially modulated single color light source which generates the single color light; and exposing the film with the spatially modulated single color light source to produce a watermark.

In another embodiment, the apparatus provides a spatially modulated single color light source spatially modulated with a watermark that provides sufficient intensity to expose color print film at high transport speeds. The apparatus comprises a blue LED light source which illuminates and is modulated by a spatial light modulator (reflective LCD). In another aspect of the invention, the characteristic D log E film curve is modified for the blue sensitive layer to compensate for any contrast loss and hue shift that a watermark pre-exposure would normally cause. According to a further aspect of the invention, the exposure at the film plane is increased by pulsing the LED source at high current for short time periods, illuminating and exposing only a partial frame, combining two LED sources slightly different in wavelength, and using both of the two orthogonal polarization states to expose.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
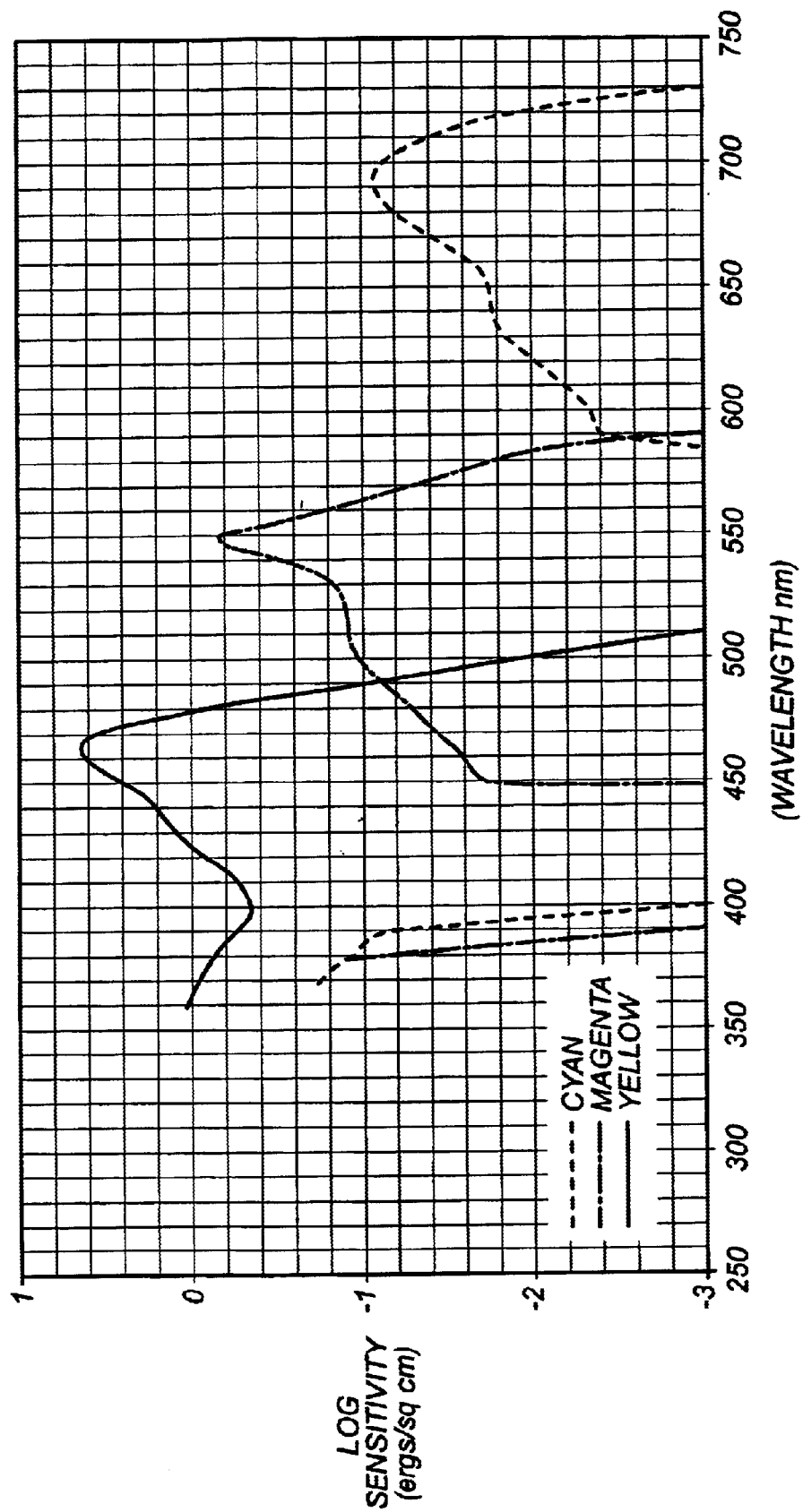
FIG. 1 is a spectral sensitivity curve for a typical color print film.

Referring now to FIG. 1, the spectral sensitivity curve for Eastman Kodak Color Print Film Type 2383, it can be seen that the sensitivity of the blue sensitive layer is basically ten times that of the green layer, and one hundred times that of the red layer. Blue exposure creates yellow density, green creates magenta density, and red creates cyan density. To convert log sensitivity on the graph to ergs/sq cm, raise 10 to the power of the value read from the graph and then invert the result. For example, if the log sensitivity value is $-2$, raise 10 to the $-2$ power, which is 0.01 and then invert that value to get 100 ergs/sq cm. Plotting the curves in this manner results in: the higher the curve, the higher the sensitivity.

If, for example, the necessary blue exposure could be achieved in the allotted exposure time with four large area blue LEDs, then it would take roughly 40 green LEDs to achieve the same exposure of the green layer, and 400 red LEDs to achieve the same exposure of the red layer. In all, 440 LEDs would then be required if a neutral RGB exposure were used. As detailed in U.S. patent application Ser. No. 10/342,009, if a typical f/4 optical system is used for illumination and imaging, then the LEDs basically would have to be packed into a 1"×1" area. Placing 440 large area LEDs or even 5 mm encapsulated LEDs in that area is not possible.

The problem would be greatly simplified if the watermark exposure were made only in blue. Then, the number of LEDs required would be reduced by a factor of over 100.

Furthermore, the watermark would not appear as neutral gray, as with an RGB exposure, but as yellow. The frequency dispersed data image that is the watermark appears as random spatial noise and would be very difficult for the human eye to distinguish if it occurs at low level and in yellow only. The human eye has more of a problem seeing image structure and detail in yellow for two reasons: there are fewer blue cones than red or green, and the eye optics has a poorer MTF response in blue. The human vision system has low spatial resolution in the blue-yellow opponent channel, as is taught by Berns in "Billmeyer & Saltzman's Principles of Color Technology" $3^{rd}$ Edition, pages 14–16. This decreased response is the result of the lower number of S cones (blue sensitive) relative to L and M cones (red and green sensitive), as well as the poorer performance of the eye's optics at short wavelengths. Thus, high spatial frequency patterns in yellow may exhibit very low or no visibility to the human eye, but can still be detected with electronic imaging systems. At high amplitudes, high spatial frequency yellow patterns may be perceived as an overall solid yellow hue. However, by appropriately limiting the amplitude and modulation of the pattern, visibility to the eye may be diminished to the point of little or no perception.

Figure 2:
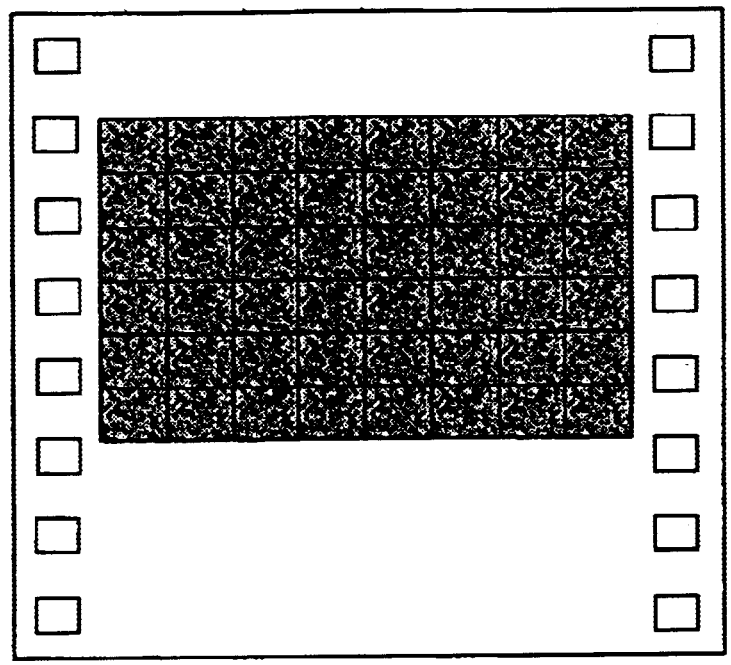
FIG. 2 is a schematic diagram of a full frame of a tiled watermark, consisting of eight tiles across the film and six tiles in the film length direction.

FIG. 2 shows how a full frame watermark would appear on the film. The writer optics, shown in FIG. 7b, images the LCD array 91 onto the film 140 via print lens 110. The pixel size is approximately 12 um square at the film plane and there are 2048 pixels in one line across the film and 1536 lines down the film. If these pixels are grouped as tiles of 256 pixels by 256 lines, as described in U.S. Pat. No. 6,044,182, then there are eight tiles across and six tiles down to make up a full frame plus interframe gap. The boundaries of the tiles are exaggerated for clarity. The overall effect is that of a random noise pattern. In every tile, there exists complete watermark information. Thus, there are 48 redundant watermarks in every frame of the movie film and the entire image area is covered by the watermark, including the interframe gap. Since it is not known which perf will be used for frame registration in the film writer, it is important to cover the entire area so that a fainter stripe, where the watermark is absent, does not appear if the presumed interframe gap during watermarking happens to land in the middle of the pictorial image exposed later. The eye is very sensitive to such correlated differences in exposure and will easily pick out slight differences.

Figure 3:
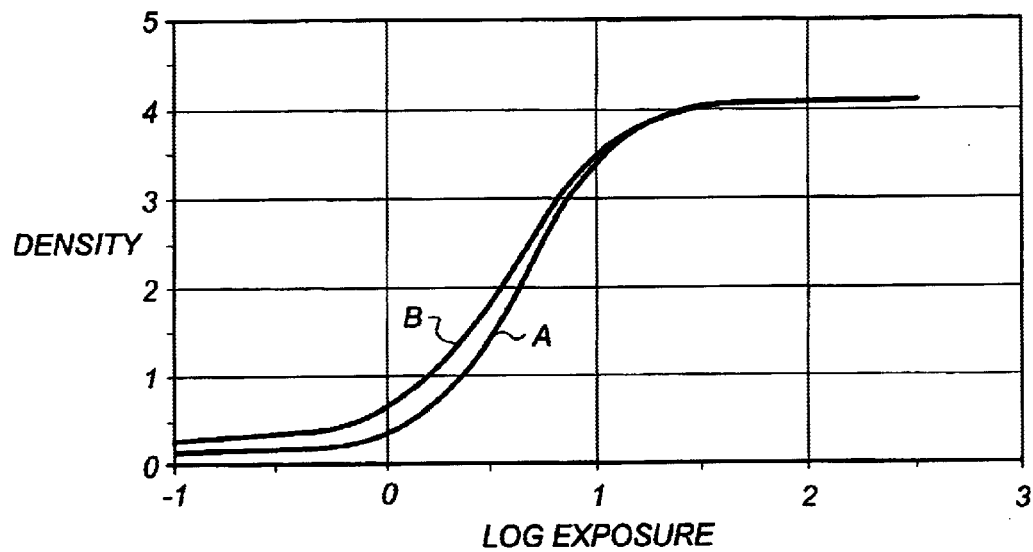
FIG. 3 is a film D log E curve showing the nominal film curve and the curve with added blue watermark exposure.
Figure 4:
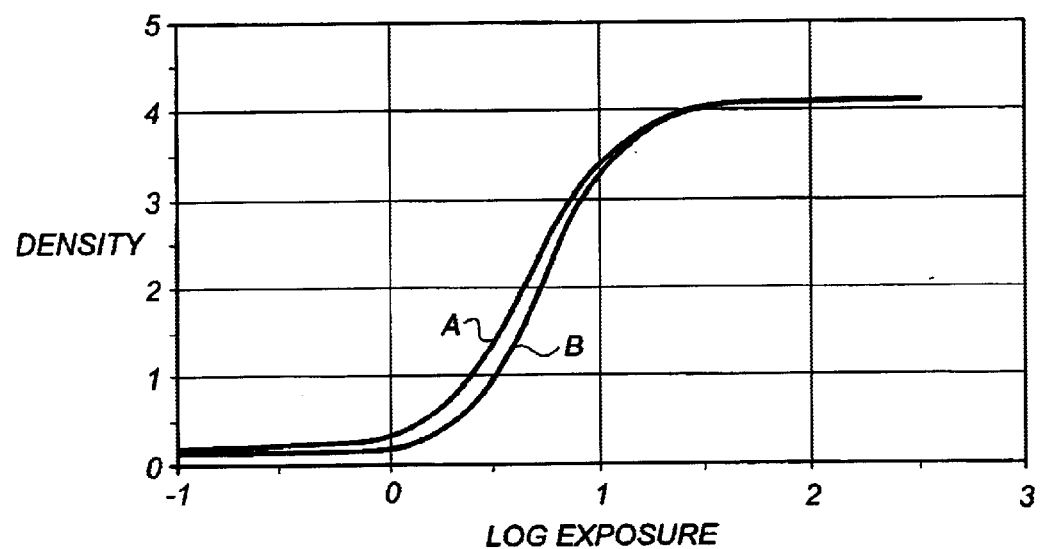
FIG. 4 is a film D log E curve showing the nominal curve and film curve compensated for added watermark exposure.

There are two problems that occur with a low level exposure in blue only: hue shift and loss of contrast, both occurring at low densities (print highlights). FIG. 3 shows the D log E (density vs. log of exposure) curve for the film for the nominal film (curve A) with no watermark exposure and for the same film with a pre-exposed watermark (curve B) of density 0.1. The watermark density must be at least 0.01 above Dmin to be detected. The shape is distorted primarily at the low density end and the contrast (slope of the curve) is reduced. This shape change means that highlights will have a yellow tint and the hues will be shifted toward yellow in differing amounts at different brightness levels in the scene. Because this is a movie film and intended to be viewed in a darkened theater without a reference white, unlike a paper print with a white border, the eye brain combination will tend to compensate for the slight yellow tint of the highlight area. However, the hue shift can only be exactly compensated for by the printer at one density level, such that the hues at other densities will not be quite right. The amount of error depends upon the amount of watermark exposure. To get a better compensation for hue shift and to improve highlight contrast in yellow, the shape of the film D log E curve can be altered as shown in FIG. 4. FIG. 4 again shows the nominal film curve, A, without watermark exposure and it also shows the new film curve compensated for receiving a watermark exposure. A film designed with the compensated curve, B, when pre-exposed with the watermark, will then match curve A, the nominal film curve when it is processed. Thus, a film designed with curve B, when pre-exposed with a watermark, will have the nominal contrast and curve shape. The contrast loss and hue shift in the low density region will not occur. If the watermark is to be used for blue exposure only, then just the blue emulsion characteristic needs to be compensated.

Figure 5:
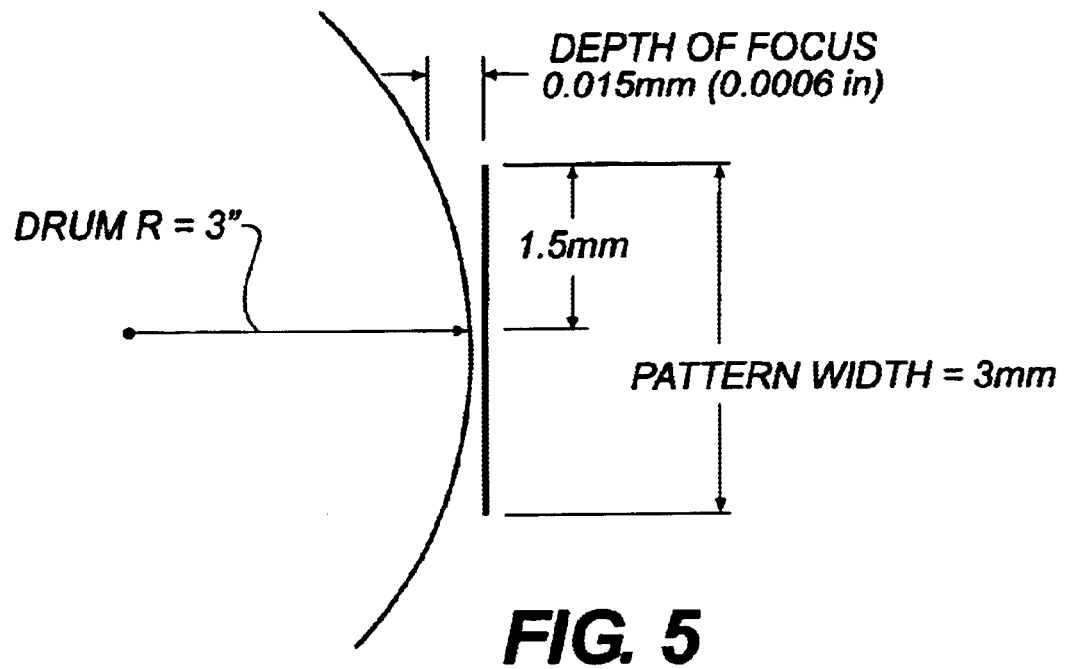
FIG. 5 shows a partial frame exposure (single row of tiles) that covers a sprocket length (perf to perf separation distance) of the film.

FIG. 5 is a schematic drawing showing the difficulty in trying to image the LCD onto the curvature of the film transport drum. There is a depth of focus problem if the full LCD array is to be imaged. It is possible, but expensive, to design the print lens with a curved field in one dimension. FIG. 5 shows the dimensions of the image if just a single row of tiles is imaged instead. The row of tiles consists typically of 256 lines, each 12 um wide. The tiles would be 3 mm wide at the drum. The deviation from a flat plane over +/−1.5 mm is 0.006". The peak to peak depth of focus is typically 0.002" to 0.003". Therefore, if a single row of tiles is imaged, rather than the six rows as shown in FIG. 2, there is no problem with focus. FIG. 5 shows all the focus error to one side. Focus can be reset to the center of this range such that focal plane error is +/−0.003" from nominal.

Figure 6:
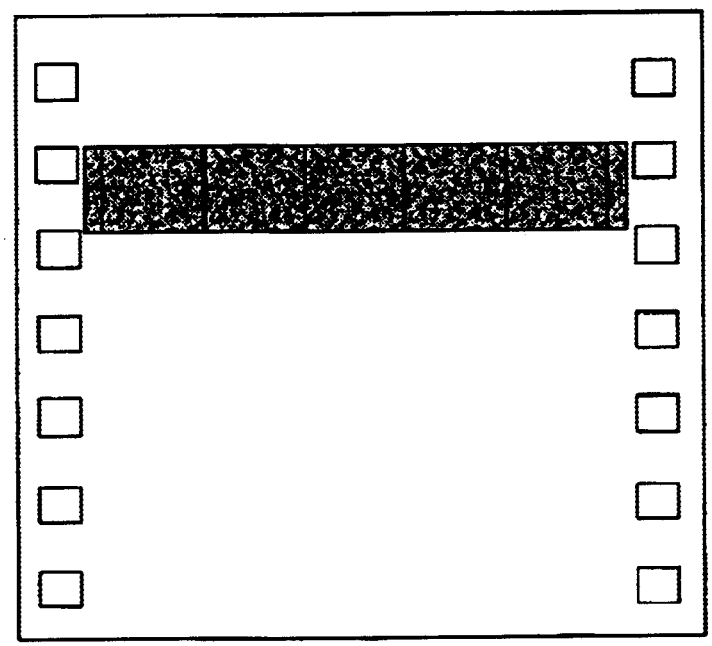
FIG. 6 shows a drawing of the drum curvature and its effect on focus.

FIG. 6 shows a single row of tiles imaged onto the film. In this case, the magnification of the print lens has been changed slightly such that height of a single row of tiles now corresponds to a sprocket length along the film. This change will have only a minor impact on the focal depth calculated previously. What this change will allow is the use of this pre-exposed film with just about any motion picture film format on the market. Most cameras expose at four perfs per frame, but there are some that use three perfs per frame, especially for TV advertising. There is no a priori knowledge at manufacture nor is there a mark on the film for the person loading the camera as to which perf is to be designated as the first perf in a frame. By synchronizing the pattern to the perfs, the watermark location will always be known, greatly simplifying the process of locating and decoding the watermark. The final pattern will be similar to FIG. 2 once a full frame area is exposed, but with approximately 5.3 tiles across the film and four rows of tiles down the film for each frame. Since the entire message is contained in each tile, it does not matter that there might be a non-integer number of tiles in any direction. There may likely be some zooming and cropping occurring in a typical camcorder capture, causing a non-integer number of tiles.

Figure 7A:
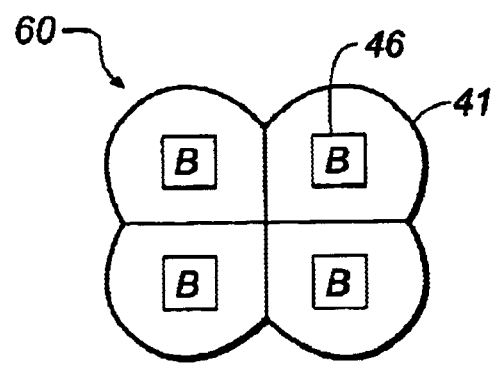
FIG. 7a shows and array of four large area LEDs with collector cone optics.

FIG. 7a is a drawing of the LED array 60, consisting of multiple large area LEDs 46, combined with modified collector cone optics 41 to allow close packing of the sources.

Figure 7B:
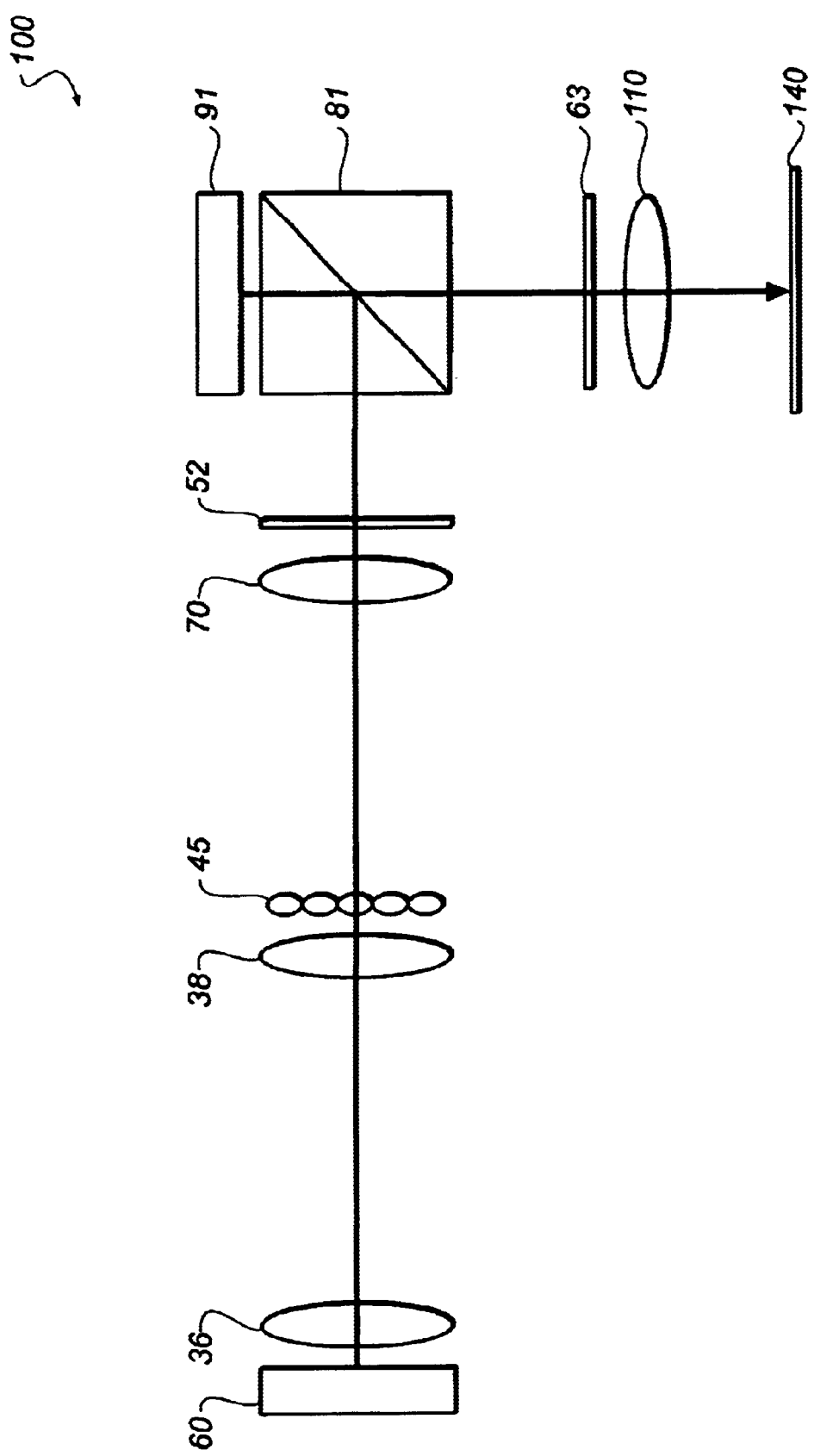
FIG. 7b is a schematic of the writer optics using a single array of LEDs.

FIG. 7b is a schematic of an optical system of a spatially modulated light source 100, i.e. film writer, that uses a single array of LEDs 60 to provide light. As discussed previously, it is advantageous that these all LEDs be a single color, in this case, blue. Referring to the film curve in FIG. 1, the term "blue" refers to any wavelength in the 395 nm to approximately 485 nm region that exposes the blue sensitive film layer. For the purposes of this invention, "single color light source" refers to any wavelength that exposes substantially only one of the color sensitive layers. The eye may be able to distinguish the color difference between an LED at 420 nm and one at 450 nm, but the film cannot.

Referring to FIG. 7b, the single color LED array 60 generates blue light which is collimated by relay lens 36 and directed to the uniformizer lenslet array 45 by field lens 38. Condenser lens 70 images each of the lenslets coincident with each other onto LCD array 91, thus uniformizing the light. Condenser lens 70, along with each lens comprising the second surface of uniformizer lenslet array 45 form a beam expander to image the light at each lens comprising the first surface of uniformizer 45 to the proper size at the LCD surface. The uniformizer lenslets are spherical lenses that typically have a square cross section, such that the uniform light at the LCD surface is also square in cross section. Polarizer 52 provides the linearly polarized light needed by the reflective LCD array 91. Polarizing beamsplitter 81 reflects s-polarized light to the LCD and p-polarized passes right through the beamsplitter and out of the optical system. The polarizing beamsplitter 81 can be a MacNeille prism or a wire grid. Analyzer 63 is orthogonal to polarizer 52 and will only pass p-polarized light. Voltage applied to the individual pixel sites in the LCD 91 by an electronic driver board (not shown) rotates the plane of polarization of the s-polarized light entering it on a pixel by pixel basis. The polarization beamsplitter 81 passes the p-polarized component of the spatially modulated light reflected from the LCD such that an intensity modulated image light is sent to the print lens 110 which images the light onto the film located at film or media plane 140. Similar optical systems are known in the both the printer and projection art, and the functions of each component are discussed in detail in U.S. Pat. No. 6,215,547. However, such systems, as described in U.S. Pat. No. 6,215,547 and in U.S. patent application Ser. No. 10/342,009 typically lack the radiance and power required to print on film at high speed.

The radiance of a large LED (1 mm×1 mm) is in the range of 0.3 to 1.5 Watts/sq cm–sr, with the best estimate for blue being roughly 1 W/sq cm–sr. In general, since radiance is not increased in an optical system, the source radiance must be equal to or greater than the radiance at the film in order to deliver the required exposure. A typical LCD printer optical system is designed for a cone angle of f/4, or 0.0625 sr. The film area to be exposed, using a full frame 35 mm movie format and including the interframe gap, is 5 sq cm. Assuming a 10% smear is allowable for a 12 um pixel, to assure robust detection, the exposure time must be held to roughly 100 ns. The exposure energy required to provide sufficient density for watermark detection is approximately 0.07 ergs/sq cm. To deliver this much energy in 100 ns requires 0.355 Watts at the film plane. Combining the power, the area, and the cone angle to get the radiance in W/sq cm–sr gives 1.1 W/sq cm–sr. This means that for a lossless system, there will just about be enough radiance at the film to make the exposure. However, the typical efficiency of the optical system shown in FIG. 7b is roughly 2.5% to 3% in the blue wavelengths. That means that the source radiance would have to be 30 to 40 times higher, or roughly 35 W/sq cm–sr, to make up for the efficiency loss. A calculation based on power requirements leads to a similar conclusion of a shortfall of 30× to 40× for a 100 ns exposure time.

It is desirable to use an LED source because of its simplicity, cost, spectral quality, and ability to be switched on and off rapidly. The solutions lie in trying to increase the source radiance and optical efficiency and in reducing the radiance required at the film. Increasing the cone angle of the optics from f/4 is possible but difficult and expensive, because the print lens is basically imaging at 1:1 magnification and is already designed as for f/2 with infinite conjugates. It is possible to decrease the area of a given exposure, as indicated in the partial frame exposure of FIG. 6, although more exposures will be required to make a full frame. By exposing a single row of tiles at one perf width, one fourth of a frame, the energy of a full frame can be directed to an area one fourth of that size, increasing the energy density by a factor of four. Of course, four exposures must now be made for a full frame. For the full frame exposures, a 100 ns flash would have to occur every 1 ms, the time it takes the film to move a full frame. This translates into a very low duty cycle required from the light source. For the partial frame exposure of FIG. 6, the exposures would still be 100 ns long, but occurring every 250 us, still a very low duty cycle. The magnification of the print optics can set the height of 256 lines equal to the perf to perf separation. Setting the height of the illumination area on the LCD equal to 256 lines is set by the magnification of the illumination system and the lenslet height. The length of the illumination area on the LCD is set by the lenslet length or equivalently, the lenslet aspect ratio. In the case shown in FIG. 6, the aspect ratio can be 5.3, such that only 5.3 tiles of the eight tile length on the LCD imager are illuminated.

Figure 8:
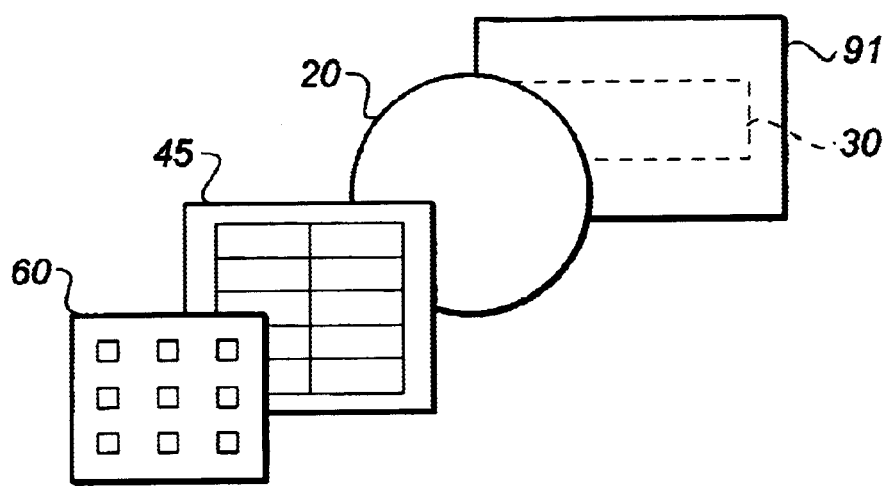
FIG. 8 is a perspective drawing of the illumination portion of the writer optics that incorporates an array of rectangular lenslets to illuminate only a portion of the full LCD frame.
Figure 9:
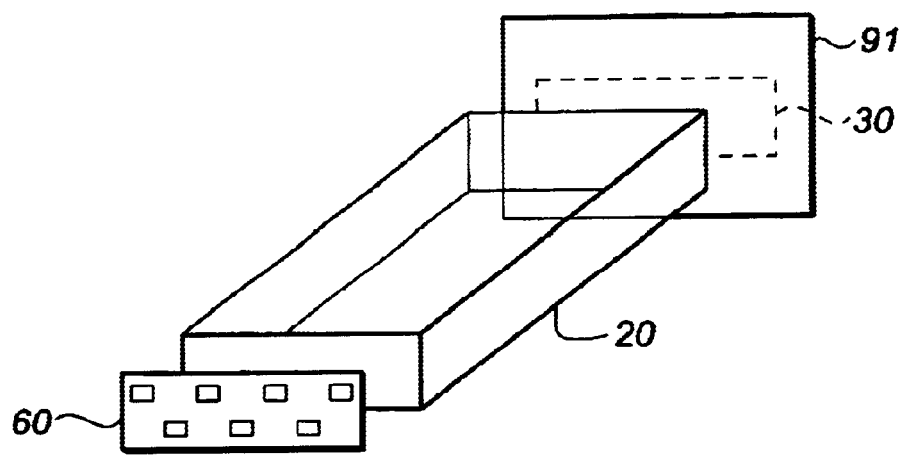
FIG. 9 is a perspective drawing of the illumination portion of the writer optics that incorporates a rectangular LED source and a rectangular integrator bar to illuminate only a portion of the full LCD frame.

FIGS. 8 and 9 show potential modifications to the optics of FIG. 7 to accomplish partial frame exposure while making efficient use of the source light. FIG. 8 is a perspective view of an optical system for efficient partial frame exposure. It uses components of similar functionality as FIG. 7b, but some components have been omitted for clarity. Because the image of the lenslets is relayed to the LCD such that the light of each lenslet is coincident, the uniformized light at the LCD has the aspect ratio of each lenslet. This is a feature of the lenslet array optical system and the use of a slightly rectangular (4:3) lenslet array to improve LCD illumination efficiency is disclosed in U.S. patent application Ser. No. 10/067,929. For the full frame exposure, shown in FIG. 2, the lenslets could have a 1:1 aspect ratio for a square illumination region at the LCD or a slightly rectangular (4:3) aspect ratio for improved efficiency. In the case of partial frame exposure, shown in FIG. 6, the lenslets would have a rectangular cross section with an 5.3:1 aspect ratio to image the light that would normally cover an 8 tile by 6 tile region (4:3) down to an 5.3 tile by 1 tile region. The individual lenslets are basically 5.3:1 rectangular sections of spherical, circular lenses. Referring to FIG. 8, the single color LED array 60 illuminates the uniformizer lenslet array 45, which consists of an array of lenslets, each having an aspect ratio consistent with that of the partial frame illumination illuminated area 30. The light entering the lenslets is imaged by condenser lens 70 to the illuminated area 30 of the spatial light modulator 91, which is shown as a reflective LCD array. The polarization beamsplitter has been omitted for clarity. To convert the full frame illumination system of FIG. 7b to the partial frame illumination system of FIG. 8, the array of square cross section lenslets 45 in FIG. 7b is replaced with an array of rectangular cross section lenslets as in FIG. 8.

FIG. 9 shows an alternate method for uniformizing the light using an integrator bar 20 and illuminating a partial frame on the LCD. Again, some optics has been omitted for clarity. The LED array 60 is uniformized by multiple reflections within the integrator bar 20 and the output surface of the integrator bar is imaged by the condenser lens (not shown) to a illuminated area 30 on spatial light modulator 91. The LED array 60 and the integrator bar 20 have substantially the same aspect ratio as the illuminated area 30 on the LCD 91, which corresponds to a partial row of tiles as in FIG. 6. The aspect ratio needed to match FIG. 6 is 5.3:1, the same as the lenslets. In the illumination approaches of both FIG. 8 and FIG. 9, a print lens would image the illuminated area 30 at the LCD to the film plane.

Methods of shaping the illumination area or LCD as shown in FIGS. 8 and 9, but using the appropriate anamorphic optic, such as a cylinder lens and prisms, are known to those skilled in the art.

Partial frame illumination will provide a 4:1 performance improvement over the full frame illuminator, but improvements as much as 40:1 are needed to offset the system efficiency originally ascribed to FIG. 7b. Because the duty cycle of the source is small, less that 1 part in 1000, and because the on times are short, on the order of 100 ns, it is possible to pulse the LED with currents well above the DC rated current. In fact, with some LEDs and with diode lasers made of similar material as LEDs, it is possible to use up to 10 times the rated DC current, if the pulse is short (<100 us) and the duty cycle low (<0.1%). The instantaneous radiance of the LED would then be approximately 10 times the 1 W/sq cm–sr calculated previously. What is of importance to exposure in this case is the instantaneous radiance, not the average radiance. This factor of 10, coupled with the factor of four for partial frame illumination, would make up the factor of 30 to 40 shortfall mentioned before.

Figure 10:
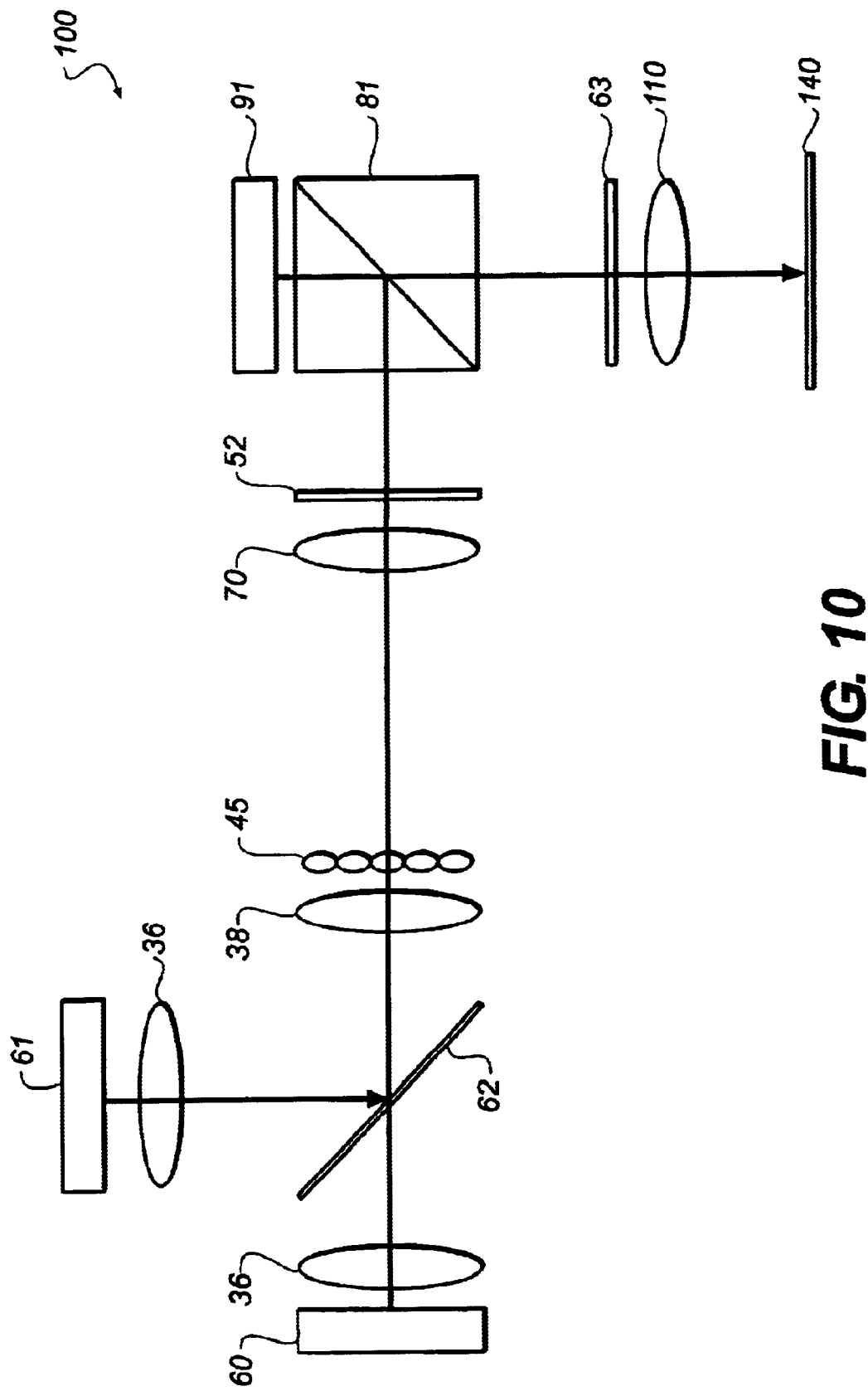
FIG. 10 is a schematic of the writer optics using two LED arrays, each with a slightly different blue wavelength.

To provide a safety factor, in case all of the above gain factor of 40 can not be realized on every system, two other techniques can be utilized. FIG. 10 shows a writer with two LED sources, 60 and 61. LED array 60 consists of an array of LEDs of a given blue wavelength, e.g. 420 nm, and LED array 61 consists of an array of blue LEDs of a slightly different wavelength, e.g. 450 nm. The film will respond to both wavelengths in a similar manner, exposing just the blue sensitive emulsion. To the film, they are substantially the same color. As shown in FIG. 10, a dichroic combiner 62 can be designed to transmit the light from LED source 60 and to reflect the light from LED source 61, effectively doubling the source radiance and the power delivered to the film.

As shown in FIG. 10, the light from LED arrays 60 and 61 is collimated by relay lens 36 and combined by dichroic combiner 62 onto a common optical path. This light is relayed by field lens 38 to uniformizer lenslet array 45. The lenslets of this array have the rectangular cross section appropriate to the partial frame illumination described above. The uniformized light is imaged to a reflective LCD 91 through a polarizer 52 and reflected from a polarization beamsplitter 81. Image light has its plane of polarization rotated by the LCD on a pixel by pixel basis. The image light with its plane of polarization rotated is passed through the polarization beamsplitter and is imaged to the film plane 140 by print lens 110, after passing through analyzer 63. The technique of FIG. 10 will allow a 2× improvement of light at the recording plane and a subsequent 2× improvement in writing speed. The LCD 91 may have a slightly different optimal response curve for each wavelength. A compromise response curve may be selected, if needed.

Figure 11:
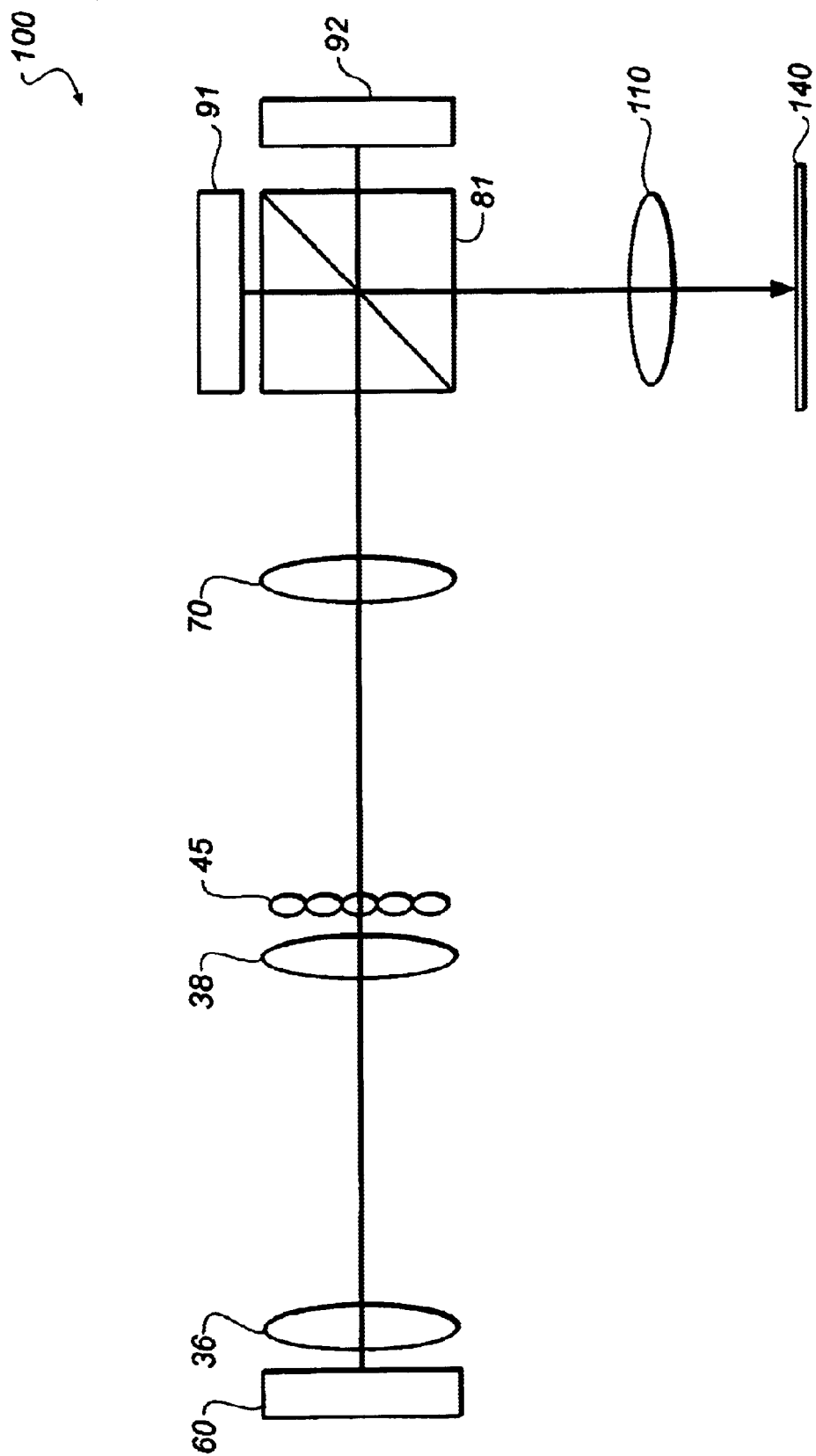
FIG. 11 is a schematic of the writer optics that uses two LCD modulators to image with both orthogonal polarization states, one from each modulator.

FIG. 11 shows another technique for achieving at least a 2× performance improvement by achieving a 2× or better improvement in optical efficiency. In this case, two LCDs are employed, one for each plane of polarization. The use of two LCDs, each using orthogonal polarizations, is disclosed in U.S. Pat. No. 6,330,018. Both the polarizer 52 and the analyzer 63, used in FIG. 10 have been removed. The light entering the polarization beamsplitter will be unpolarized. Light from LED array 60 is collimated by relay lens 36 and directed to the uniformizer lenslet array 45 by field lens 38. The lenslets in the array 45 have a rectangular aspect ratio that matches that of the partial frame exposure required. The uniformized light is imaged onto reflective LCD arrays 91 and 92. The unpolarized light entering the polarization beamsplitter 81 is split into two orthogonal plane polarized components, with the s-polarized light directed toward the first spatial light modulator 91 and the p-polarized light directed toward the second spatial light modulator 92. Image bearing light from the LCD 91 has its plane of polarization rotated on a pixel by pixel basis to the p-state and passes through the polarization beamsplitter 81 to the print lens 110 and is imaged at the film plane 140. Image bearing light from the LCD 92 has its plane of polarization rotated on a pixel by pixel basis to the s-state and is reflected by the polarization beamsplitter toward the print lens 110 and imaged at the film plane 140. If the same image data is supplied to both LCDs, the result at the film plane will be an addition of the power in each image, effectively doubling the exposure by making use of both polarizations. Removing both the polarizer and analyzer is necessary for using both polarizations but has an added benefit. These polarizers are not lossless. There is typically a 25% transmittance loss even when the polarizer is aligned to the plane of polarization due to absorption. With two devices at 75% transmittance each, that's an additional factor of 2 improvement in efficiency. The technique shown in FIG. 11 can result in a performance improvement as much as 4:1.

Figure 12:
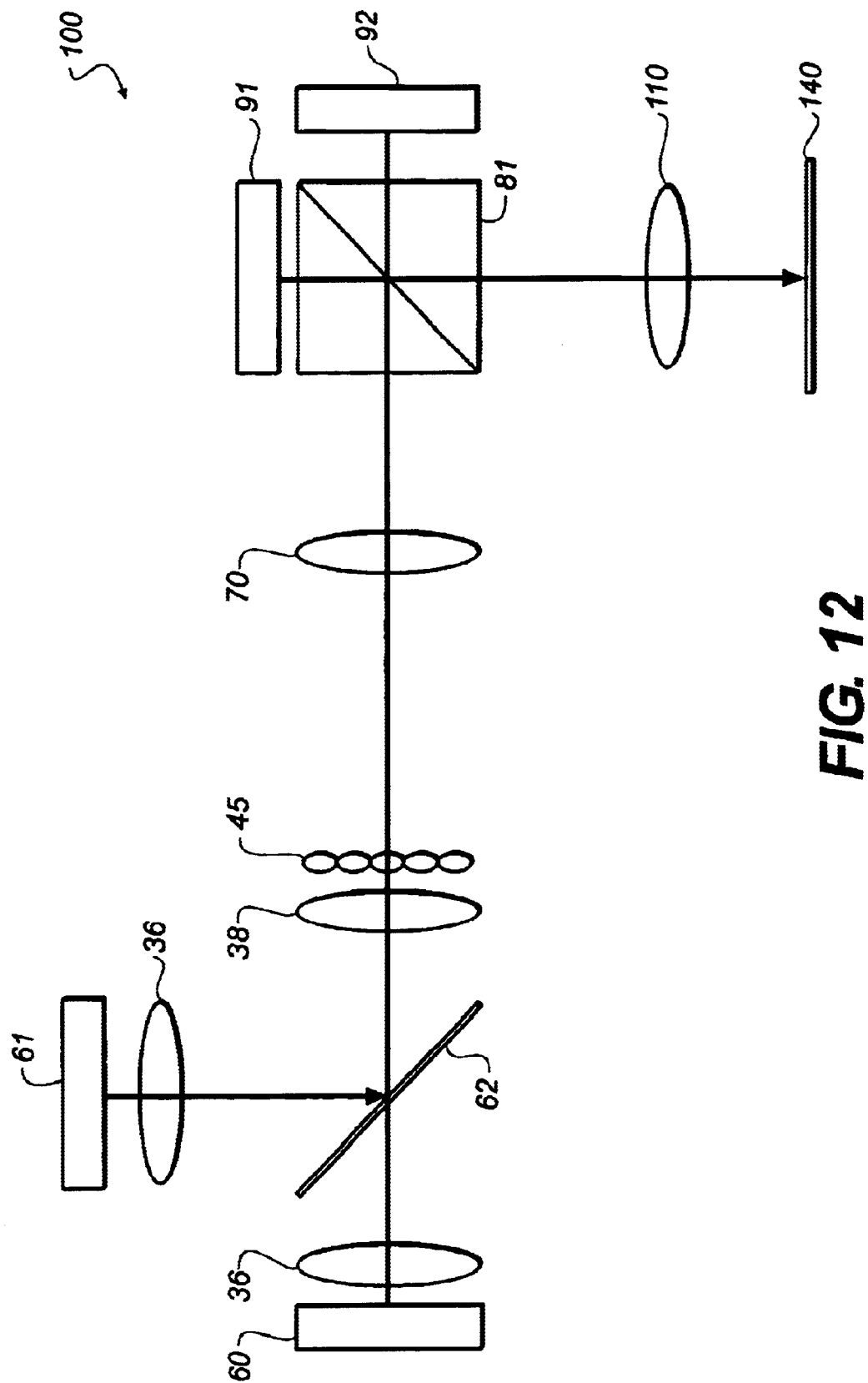
FIG. 12 is a schematic drawing of the writer optics that consists of two LED arrays and two LCD modulators.

It is also possible to combine the approaches of FIGS. 10 and 11 and use two sources and two modulators to achieve a further improvement over that shown in either figure alone. FIG. 12 shows a writer which uses two LED sources 60, 61 of slightly different wavelengths and two spatial light modulators 91, 92. The two sources are combined by a dichroic combiner 62 in the same manner as in FIG. 10. Light of both polarizations is uniformized and imaged onto the respective LCD spatial light modulators 91, 92 by the illumination optics in the same manner as in FIG. 11. The s-polarized light of both wavelengths is directed to the first LCD 91, while p-polarized light of both wavelengths is directed toward the second LCD 92. Each modulator will rotate the plane of polarization of the light on a pixel by pixel basis to form a spatially modulated beam which is imaged to the film plane 140 by print lens 110 The reflected image light from the first LCD 91 is p-polarized because of the rotation and passes through the polarization beamsplitter 81 to print lens 110. The reflected image light from the second LCD 92 is s-polarized and is reflected by polarization beamsplitter 81 to print lens 110. Both spatially modulated image beams contain both wavelengths. Each modulator may have a slightly different optimal response to each wavelength. A compromise response curve may be selected, if needed.

Although the spatial light modulators use in the above examples were illustrated by reflective LCDs, it is also possible to use transmissive LCDs. Digital Micromirror Devices (DMDs) and grating light valve arrays. Likewise, the polarizers could be plastic sheet polarizers or wire grids on glass substrates, and the polarization beamsplitter could be a prism or a wire grid. These and other variations are known to those skilled in the art.

Once a unique code or code sequence has been written on the photographic media, it is necessary to track each film reel to the laboratory that does the printing and to the distributor or film exchange. Each print copy may be shown sequentially in several theaters, and that information must also be tracked. There are many optical, electrical, and magnetic devices for doing this task, including bar codes, RFID tags, and magnetic strips which can be attached to the film can or reel.

The invention has been described in detail with particular reference to certain preferred embodiments thereof, but it will be understood that variations and modifications can be effected within the scope of the invention.

Parts List

20. Integrator bar or optical tunnel
30. Illuminated area of SLM (LCD)
36. Relay lens
38. Field lens
40. Collector cone optics
45. Uniformizer lenslet array
46. Large area LED
52. Polarizer (optional)
60. LED Array
61. Second LED array of slightly different wavelength
62. Dichroic combiner
63. Analyzer (optional)
70. Condenser lens
81. Polarization beamsplitter (MacNeille prism or wire grid)
91. Spatial light modulator (SLM)-LCD
92. Second spatial light modulator-LCD
100. Spatially modulated light source (film writer)
110. Print lens
140. Film plane

What is claimed is:

1. A method of writing a watermark to film comprising:
   compensating an emulsion of said film for pre-exposure to a single color light;
   transporting said film past a spatially modulated single color light source which generates said single color light; and
   exposing said film with said spatially modulated single color light source to produce a watermark.

2. A method as in claim 1 wherein said spatially modulated single color light source comprises a blue Light Emitting Diode (LED).

3. A method as in claim 1 wherein said spatially modulated single color light source comprises a spatial light modulator.

4. A method as in claim 1 wherein said watermark is a digital pattern on said film.

5. A method as in claim 1 comprising the additional step of:
   exposing an image on said pre-exposed film.

6. A method as in claim 5 comprising the additional step of:
   developing said film.

7. A method as in claim 1 comprising the additional step of:
   tracking distribution of said film.

8. A method as in claim 1 wherein said watermark covers substantially all of said film.

9. A method as in claim 1 wherein said light source generates said watermark by sequentially printing a partial frame.

10. A method as in claim 9 wherein said partial frames are substantially contiguous.

11. A method as in claim 9 wherein said partial frame covers substantially the full width of said film.

12. A method as in claim 9 wherein said partial frame covers a sprocket length of said film.

13. A method as in claim 1 wherein said film is motion picture film.

14. A method as in claim 1 wherein said film moves at a speed of at least one foot per second.

15. A method as in claim 1 wherein a watermark density change is at least 0.01.

16. A method as in claim 1 wherein said compensation is for contrast loss and hue shift in a blue sensitive layer of said film.

17. An apparatus for writing a watermark to film comprising:
    a transport mechanism for transporting said film;
    a single color light source which generates a single color light;
    a spatial light modulator which modulators said single color light to generate a watermark;
    an optical system which images said watermark on said film; and
    wherein an image is exposed on said film which has been pre-exposed to said watermark.

18. An apparatus as in claim 17 wherein said single color light source comprises a blue Light Emitting Diode (LED) array.

19. An apparatus as in claim 17 wherein said watermark is a digital pattern on said film.

20. An apparatus as in claim 17 wherein said imaged film is developed.

21. An apparatus as in claim 17 wherein distribution of said film is tracked.

22. An apparatus as in claim 17 wherein said watermark covers substantially all of said film.

23. An apparatus as in claim 17 wherein said light source generates said watermark by sequentially printing a partial frame.

24. An apparatus as in claim 23 wherein said partial frames are substantially contiguous.

25. An apparatus as in claim 23 wherein said partial frame covers substantially the full width of said film.

26. An apparatus as in claim 23 wherein said partial frame covers a sprocket length of said film.

27. An apparatus as in claim 17 wherein said film is motion picture film.

28. An apparatus as in claim 17 wherein said film moves at a speed of at least one foot per second.

29. An apparatus as in claim 17 wherein a watermark density change is at least 0.01.

30. An apparatus as in claim 17 wherein said single color light source comprises two Light Emitting Diode (LED) arrays which emit blue light of different wavelengths.

31. An apparatus as in claim 30 wherein said light from said LED arrays is combined with a dichroic mirror.

32. An apparatus as in claim 17 wherein:
    a lenslet array focuses light onto said spatial light modulator to illuminate a partial frame; and
    each of said lenslets has an aspect ratio which matches an aspect ratio of said partial frame.

33. An apparatus as in claim 17 wherein:
    an LED array and an integrator bar focuses light onto said spatial light modulator to illuminate a partial frame; and
    each of said integrator bar and said LED array have an aspect ratio which matches an aspect ratio of said partial frame.

34. An apparatus for writing a watermark to film comprising:
    a transport mechanism for transporting said film;
    a single color light source which generates a single color light;
    a beamsplitter which splits said single color light source into a first polarized light beam and a second polarized light beam wherein a polarization of said second polarized light beam is orthogonal to said first polarized light beam;
    a first spatial light modulator which modulates said first polarized light beam;

a second spatial light modulator which modulates said second polarized light beam;

wherein said beamsplitter combines said first and second modulated beams to generate a watermark beam;

an optical system which images said watermark beam on said film;

wherein said single color light source is comprised of:

a first Light Emitting Diode (LED) array which generates blue light having a first wavelength; and a second LED array which generates a blue light having a second wavelength.

* * * * *